United States Patent
Huang et al.

(10) Patent No.: US 9,333,653 B2
(45) Date of Patent: May 10, 2016

(54) AUTOMATIC PILL GRASPING APPARATUS AND METHOD

(71) Applicant: HON HAI PRECISION INDUSTRY CO., LTD., New Taipei (TW)

(72) Inventors: Szu-Hai Huang, New Taipei (TW); Kuo-Ming Lai, New Taipei (TW); Pei-Yi Chan, New Taipei (TW); Jeng-Che Chen, New Taipei (TW); Tui-Chien Wu, New Taipei (TW); Pao-Heng Shen, New Taipei (TW); Chao-Wen Shih, New Taipei (TW); King-Lung Huang, New Taipei (TW); Lap-Shun Hui, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 60 days.

(21) Appl. No.: 14/264,659

(22) Filed: Apr. 29, 2014

(65) Prior Publication Data
US 2015/0028050 A1 Jan. 29, 2015

(30) Foreign Application Priority Data
Jul. 29, 2013 (TW) .............................. 102127189 A

(51) Int. Cl.
*G07F 11/54* (2006.01)
*B25J 9/16* (2006.01)
*B25J 15/06* (2006.01)
*A61J 7/00* (2006.01)
*A61J 7/04* (2006.01)

(52) U.S. Cl.
CPC .............. *B25J 9/1694* (2013.01); *A61J 7/0076* (2013.01); *B25J 15/0616* (2013.01); *A61J 7/04* (2013.01); *A61J 2200/70* (2013.01)

(58) Field of Classification Search
CPC .. B65D 83/0409; B65D 83/0454; G07F 11/54
USPC ........................... 221/211; 414/1, 2, 3, 4, 5, 6
See application file for complete search history.

(56) References Cited

U.S. PATENT DOCUMENTS

| | | | | |
|---|---|---|---|---|
| 5,405,048 A * | 4/1995 | Rogers | ................. | B65G 1/1373 221/1 |
| 5,571,258 A * | 11/1996 | Pearson | ................. | A61J 7/0084 221/211 |
| 6,607,094 B2 * | 8/2003 | MacDonald | .......... | A61J 7/0084 221/119 |
| 8,326,455 B2 * | 12/2012 | Dunn | ................. | G06F 19/3462 221/211 |
| 8,360,274 B2 * | 1/2013 | Shen | ...................... | A61J 7/0084 221/123 |
| 8,636,172 B2 * | 1/2014 | Dunn | ........................ | A61J 1/03 221/151 |
| 2006/0213921 A1 * | 9/2006 | Abdulhay | ............. | A61J 7/0084 221/130 |
| 2007/0093932 A1 * | 4/2007 | Abdulhay | ............. | A61J 7/0084 700/231 |
| 2014/0131378 A1 * | 5/2014 | Shih | ......................... | A61J 7/04 221/211 |
| 2014/0305959 A1 * | 10/2014 | Chan | .................. | B65D 83/0409 221/199 |

* cited by examiner

*Primary Examiner* — Patrick Mackey
(74) *Attorney, Agent, or Firm* — Novak Druce Connolly Bove + Quigg LLP

(57) ABSTRACT

A pill grasping method comprises rotating a grasping arm with a nozzle to a predetermined initial position driven by a driving mechanism, rotating a number of pill storage cases to position one of the pill storage cases with a set number of pills to a predetermined grasping pill position driven by an actuating mechanism, rotating the grasping arm to enter into the corresponding pill storage case, starting a pump to generate a vacuum in the nozzle for sucking a pill, and determining if an actual pressure value in a pipe connecting the nozzle to the pump is less than a predetermined pressure value. The grasping arm is rotated to the predetermined initial position when the actual pressure value is less than the predetermined pressure value.

19 Claims, 22 Drawing Sheets

2

AUTOMATIC PILL GRASPING APPARATUS AND METHOD

CROSS-REFERENCE TO RELATED APPLICATIONS

This application claims priority to Taiwan Patent Application No. 102127189 filed on Jul. 29, 2013 in the Taiwan Intellectual Property Office, the contents of which are hereby incorporated by reference. Relevant subject matter is disclosed in co-pending U.S. patent applications entitled "AUTOMATIC PILL GRASPING APPARATUS", Ser. No. 14/264,629, U.S. application Ser. No. [to be advised], filed on the same day as the present application.

FIELD

The present disclosure generally relates to an automatic pill grasping apparatus and method.

BACKGROUND

Automatic pill grasping apparatuses are commonly used to help individuals, such as the elderly or chronically ill, take medication at a given date and time. Pill dispensers often include a pill storage case for storing solid pills, and a pill grasping mechanism for grasping pills from the pill storage case.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
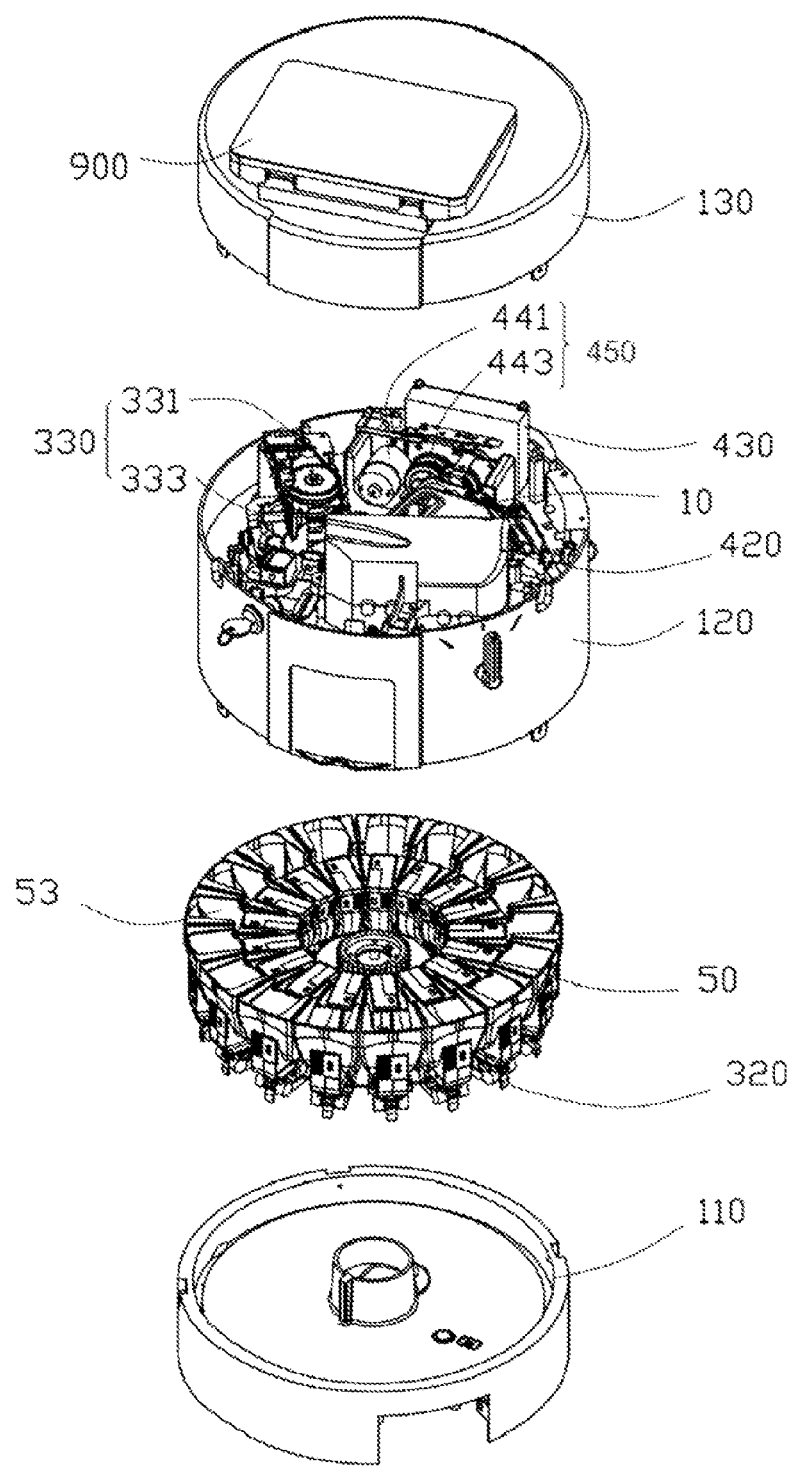
FIG. 1 is an isometric, exploded view of an embodiment of an automatic pill grasping apparatus.
Figure 2:
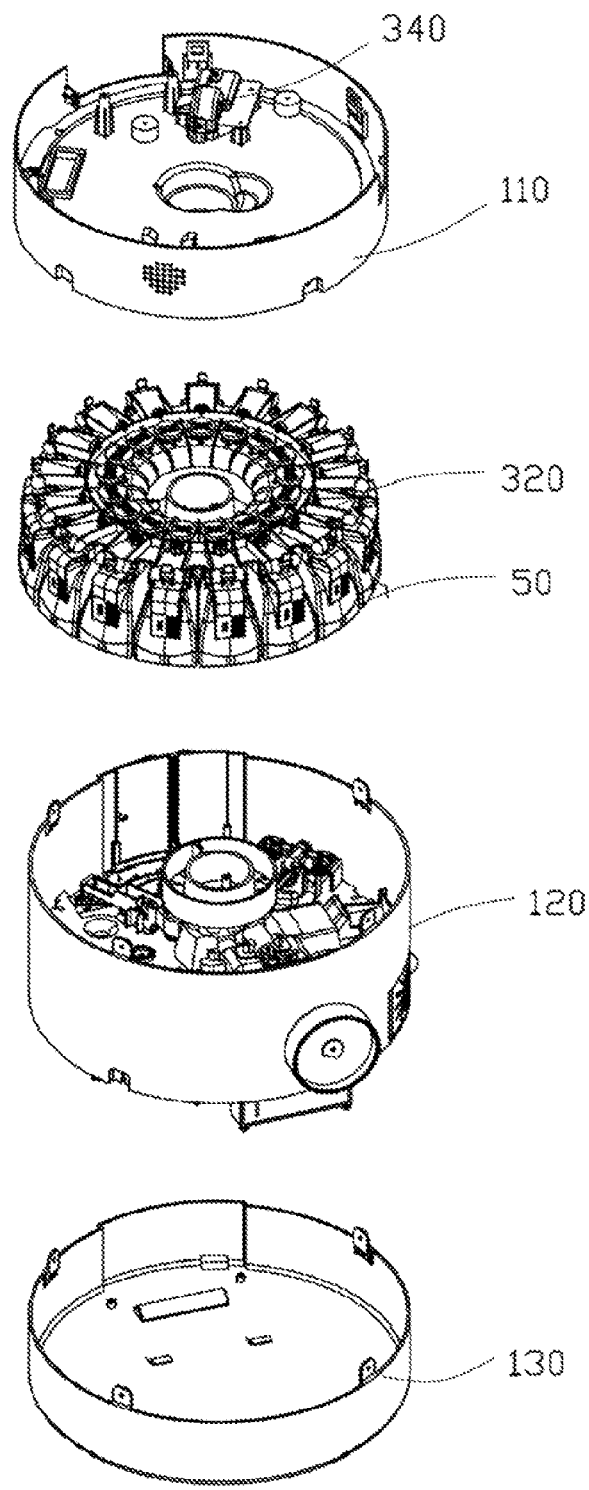
FIG. 2 is similar to FIG. 1, but showing the automatic pill grasping apparatus from another angle.
Figure 3:
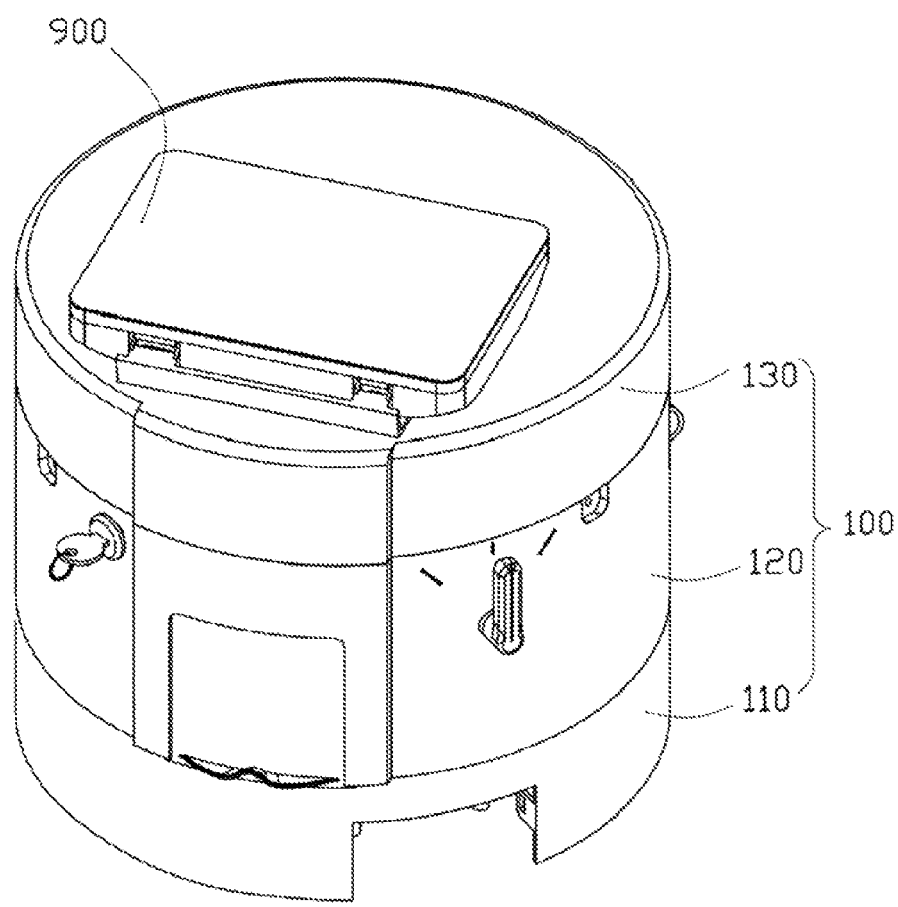
FIG. 3 is an assembled view of the automatic pill grasping apparatus of FIG. 1.
Figure 4:
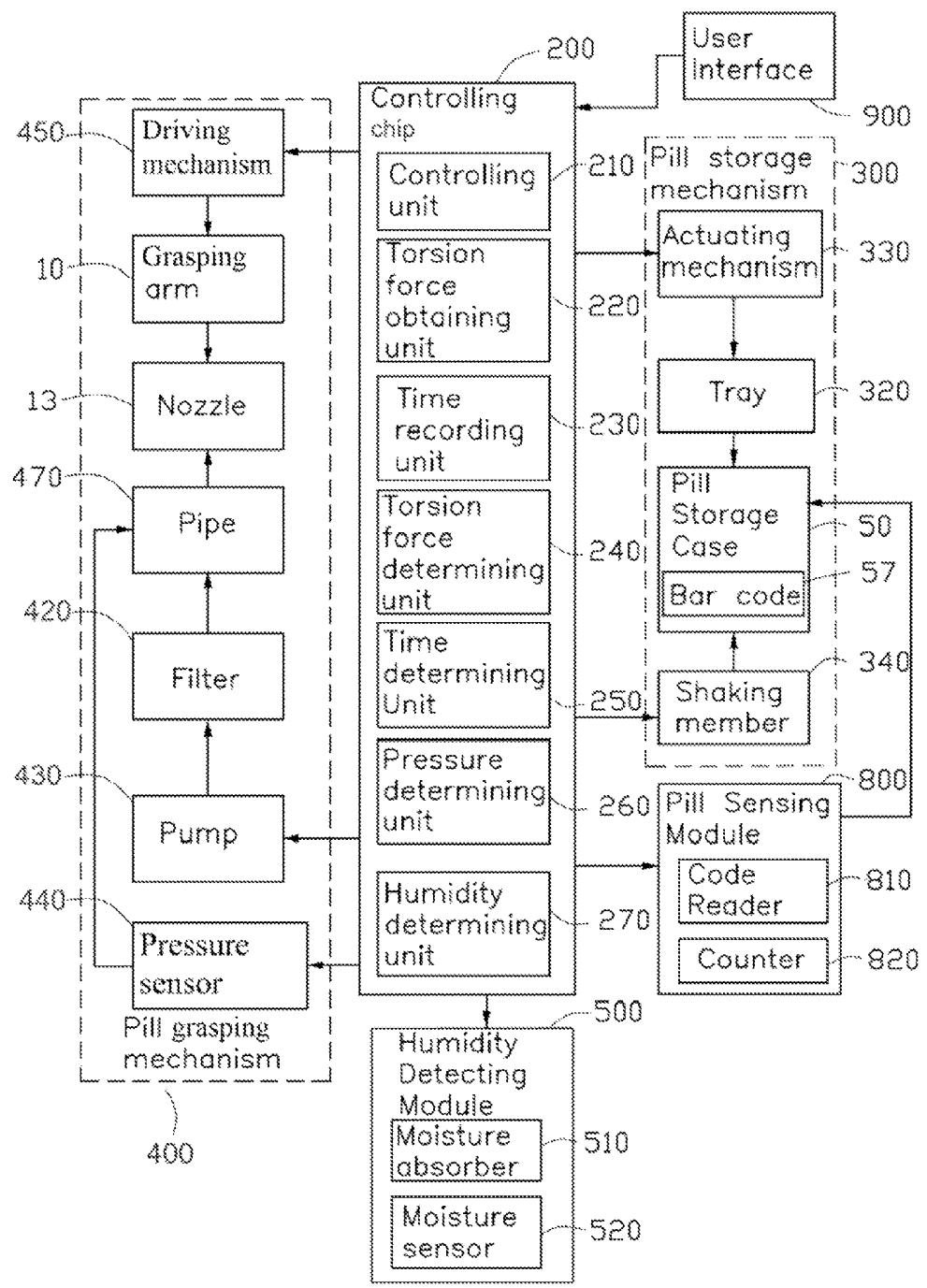
FIG. 4 is a block diagram view of the automatic pill grasping apparatus.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIGS. 1-5 illustrate an embodiment of an automatic pill grasping apparatus. The automatic pill grasping apparatus includes an enclosure 100, a controlling chip 200, a pill storage mechanism 300, a pill grasping mechanism 400, a humidity detecting module 500, a pill sensing module 800, and a user interface 900. The user interface 900 is electrically connected to the controlling chip 200, to allow a user to set a time and dose of taking pills. The enclosure 100 includes a base 110, a bracket 120 engaged with the base 110, and a top cover 130 covering the bracket 120.

The controlling chip 200 includes a controlling unit 210, a torsion force obtaining unit 220, a time recording unit 230, a torsion force determining unit 240, a time determining unit 250, a pressure determining unit 260, and a humidity determining unit 270.

The pill storage mechanism 300 is installed on the base 110 and includes a tray 320, a plurality of pill storage cases 50, a pill output case 53, an actuating mechanism 330, and a shaking member 340. The plurality of pill storage cases 50 can store a plurality of pills (not shown), and each of the plurality of pill storage cases 50 has a bar code 57 with an initial number of pills and pill species. The tray 320 is rotatably installed on the base 110 and used to rotate the plurality of pill storage cases 50 and the pill output case 53. The shaking member 340 is secured to the base 310 and can shake one pill storage case 50 at a time. The actuating mechanism 330 includes a first motor 331 and a plurality of first gears 333. The first motor 331 can drive the plurality of first gears 333, and the plurality of first gears 333 is rotatable to rotate the tray 320. Each pill storage case 50 includes an interior wall 51 which forms a storage cavity 53 (shown in FIG. 8) for storing pills. The pill storage case 50 defines a pill opening 52 for allowing access to the storage cavity 53 of the pill storage case 50. The pill output case 53 communicates with outside of the enclosure 100, and the pills can drop out of the enclosure 100 from the pill output case 53.

The pill sensing module 800 includes a code reader 810 and a counter 820. The code reader 810 can obtain an initial number of pills of each of the pill storage cases 50 before grasping the pills. The counter 520 can decrement one from the initial number after the pill grasping mechanism 400 picks one pill.

The humidity detecting module 500 includes a moisture absorber 510 and a moisture sensor 520. The moisture sensor 520 can sense an actual moisture value of the enclosure 100. The humidity determining unit 270 can determine if the actual moisture value is greater than a predetermined moisture value. The moisture absorber 510 can absorb moisture in the enclosure 100 when the actual moisture value is greater than the predetermined moisture value.

Referring to FIGS. 1-5, in at least one embodiment, the pill grasping mechanism 400 includes a grasping arm 10, a nozzle 13 secured to the grasping arm 10, a filter 420, a pump 430, a pressure sensor 440, and a driving mechanism 450. The pump 430 can produce a vacuum in the nozzle 13 so that the nozzle 13 can suck pills. The filter 420 is connected to the pump 430 and the nozzle 13 by a pipe 470 and can filter the vacuum generated by the pump 430. The pressure sensor 440 can sense an actual pressure value of the pipe 470.

The driving mechanism 450 includes a second motor 441 and a plurality of second gears 443. The second motor 441 can rotate the plurality of second gears 443. The plurality of second gears 443 can rotate the grasping arm 10.

Figure 5:
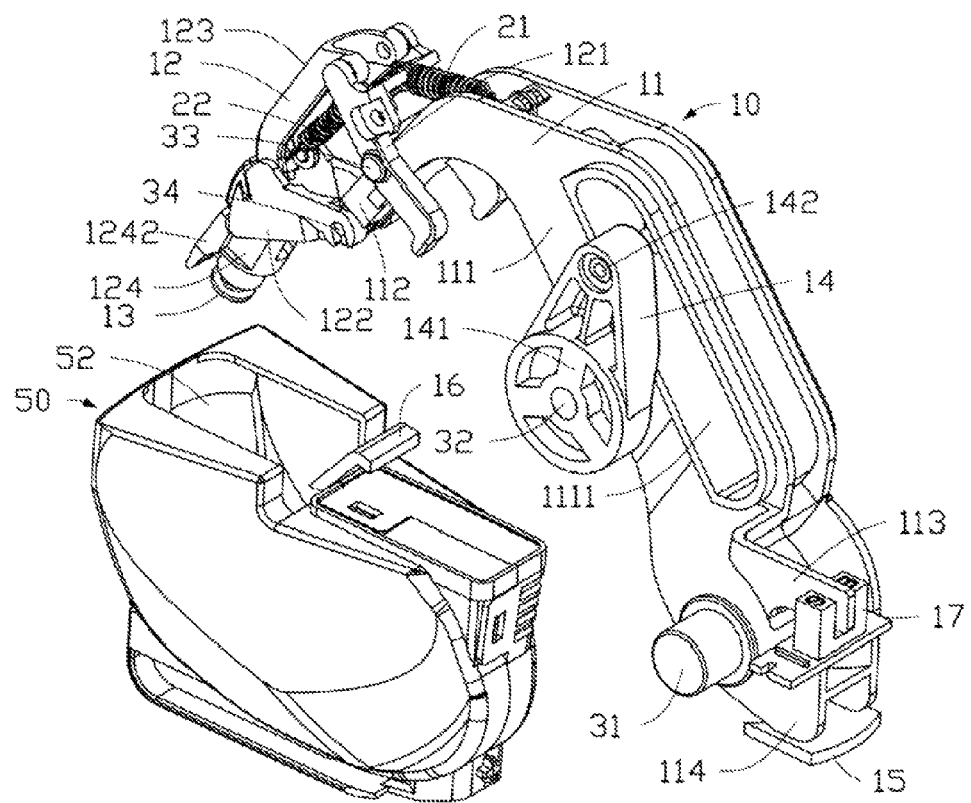
FIG. 5 is an isometric view of an embodiment of a grasping arm and a pill storage case.
Figure 6:
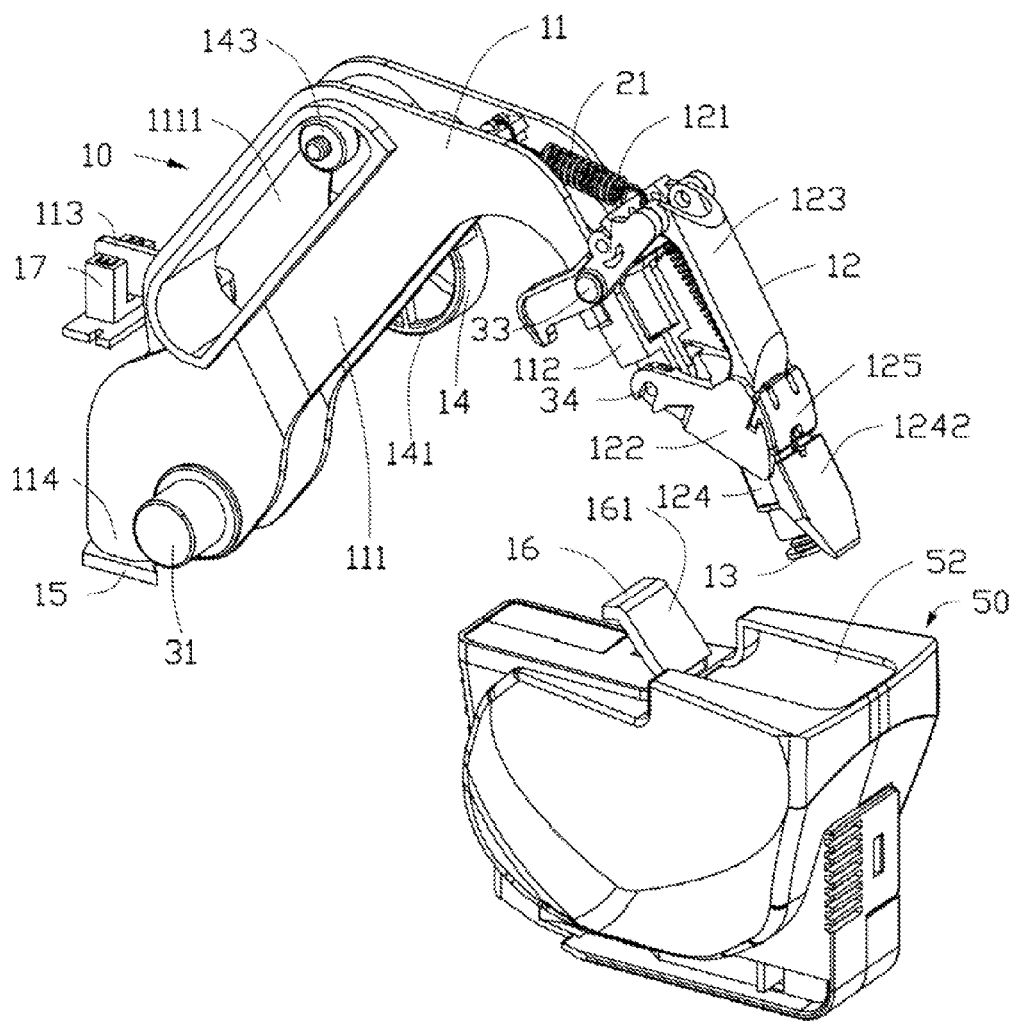
FIG. 6 is similar to FIG. 5, but viewed from another aspect.
Figure 7:
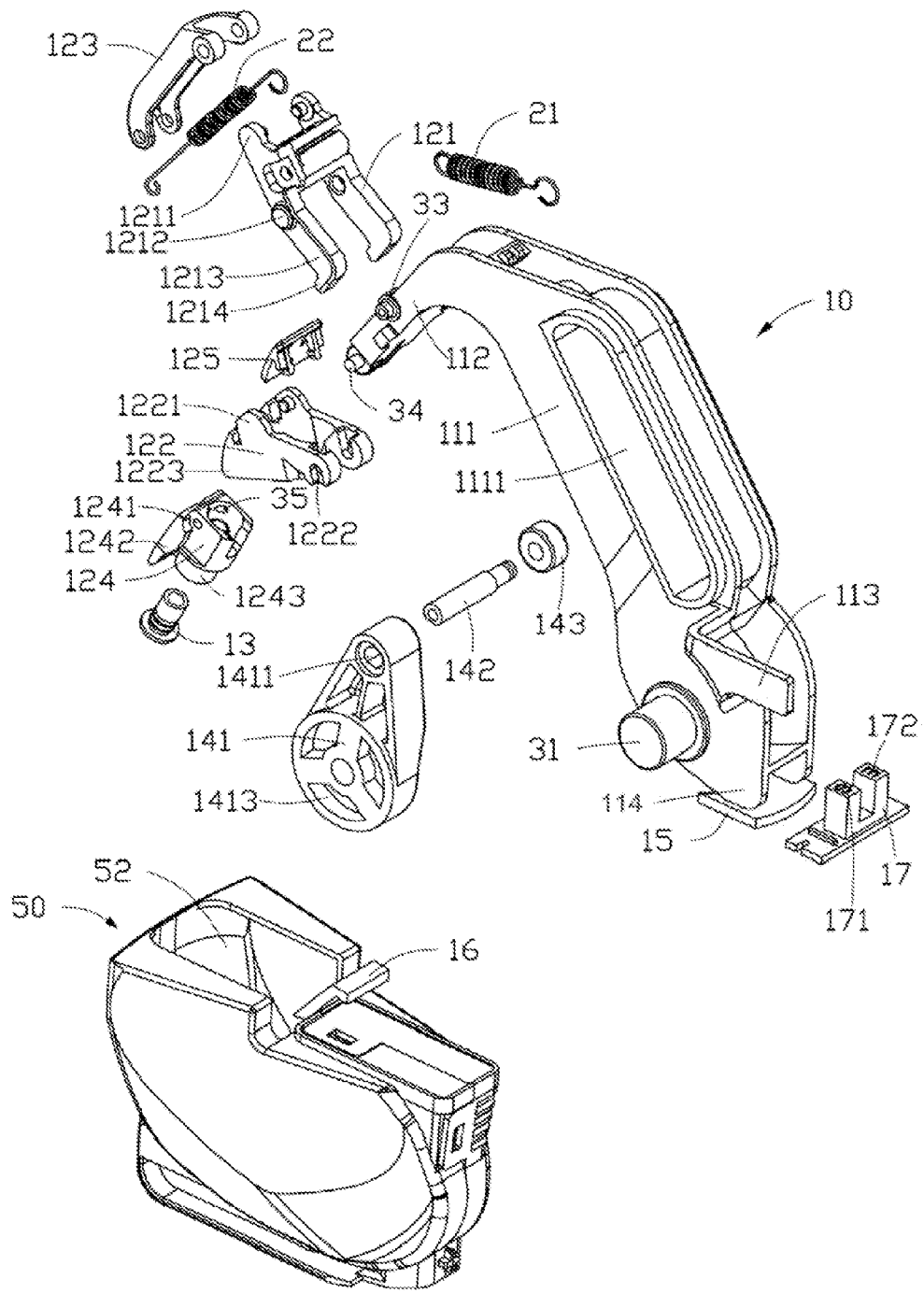
FIG. 7 is an exploded view of the grasping arm and the pill storage case of FIG. 5.

FIGS. 5-7 show that the grasping arm 10 includes a main arm 11, a linkage mechanism 12, a holder 124, a transfer mechanism 14, a first blocking member 16, a second blocking member 15, and a position sensor 17.

The main arm 11 is rotatable about a first axis 31 and includes a main body 111, an installation portion 112, a breaking portion 113, and a contacting portion 114. The main body 111 defines a through hole 1111. The through hole 1111 is cooperatively bound by two opposite straight walls and two opposite curved walls of the main body 111. The installation portion 112 extends from an upper end of the main body 111, and the breaking portion 113 extends from a lower end of the main body 111. The installation portion 112 is substantially perpendicular to the main body 111. The contacting portion 114 extends from the lower end of the main body 111 and is adjacent to the breaking portion 113.

The transfer mechanism 14 includes a transfer cam 141, a driving shaft 142, and a driving wheel 143. The transfer cam 141 is rotatable about a second axis 32. An end portion of the transfer cam 141 defines a fixing hole 1411. A first end of the driving shaft 142 is received into the fixing hole 1411, so that the driving shaft 142 is fixed to the transfer cam 141 and can be rotated about the second axis 32 by the transfer cam 141. The driving shaft 142 is substantially perpendicular to the transfer cam 141. The driving wheel 143 is mounted to a second end portion of the driving shaft 142 and is rotatable about the driving shaft 142. The second axis 32 is higher than the first axis 31. The transfer cam 141 defines one or more slots 1413 for connecting to a motor (not shown), such that the transfer cam 141 can be rotated about the second axis 32 by the motor.

The second end portion of the driving shaft 142 is received into the through hole 1111 of the main body 111. Thus, the driving wheel 143 is received into the through hole 1111 of the main body 111. When the driving shaft 142 is rotated by the transfer cam 141 about the second axis 32, the driving wheel 143 is rolled along an inner wall of the through hole 1111 of the main body 111, and drives the main body 111 to rotate about the first axis 31.

The linkage mechanism 12 includes a first linkage arm 121, a second linkage arm 122, and a third linkage arm 123.

The first linkage arm 121 includes a first connecting end portion 1211, a first pivot portion 1212, and a contacting end portion 1213. The first pivot portion 1212 is pivotably coupled to the installation portion 112 of the main arm 11. The first linkage arm 121 is rotatable about a third axis 33. The first connecting end 1211 and the contacting end 1213 are located at opposite sides of the first pivot portion 1212. The contacting end 1213 includes a protrusion 1214 extending downward.

The second linkage arm 122 includes a second connecting end portion 1221, a second pivot portion 1222, and a third connecting end portion 1223. The second linkage arm 122 is substantially triangular. The second connecting end 1221, the second pivot portion 1222, and the third connecting end 1223 are substantially three corners of a triangle. The second pivot portion 1222 is pivotably coupled to the installation portion 112 of the main arm 11. The second linkage arm 122 is rotatable about a fourth axis 34.

A first end portion of the third linkage arm 123 is pivotably coupled to the first connecting end 1211 of the first linkage arm 121. A second end portion of the third linkage arm 123 is pivotably coupled to the second connecting end 1221 of the second linkage arm 122. When the first linkage arm 121 is rotated about the third axis 33, the third linkage arm 123 is moved by the first linkage arm 121, thus driving the second linkage arm 122 to rotate about the fourth axis 34.

The holder 124 includes a third pivot portion 1241, a shovel 1242, and a receiving portion 1243. The third pivot portion 1241 is pivotably coupled to the third connecting end 1223 of the second linkage arm 1221. The holder 124 is rotatable about a fifth axis 35. The nozzle 13 is received and mounted in the receiving portion 1243. The shovel 1242 is located on an outer side of the receiving portion 1243. A length of the shovel 1242 is greater than a length of the receiving portion 1243. The shovel 1242 is substantially flat. The nozzle 13 is connected to the pump 420 to suck a pill from the pill storage case 50.

In one embodiment, the linkage mechanism 12 includes a cover 125. The cover 125 is mounted to the second linkage arm 122 and the third linkage arm 123. The cover 125 covers a gap (not labeled) between the second linkage arm 122 and the third linkage arm 123 to prevent a pill from getting stuck in the gap.

The position sensor 17 is substantially U-shaped. The position sensor 17 includes a signal transmitter 171 and a signal receiver 172. The signal transmitter 171 and the signal receiver 172 face each other. The signal transmitter 171 transmits a signal, e.g., an optical signal, to the signal receiver 172. When the breaking portion 113 of the main arm 11 is moved to a position between the signal transmitter 171 and the signal receiver 172, the breaking portion 113 blocks signal transmission between the signal transmitter 171 and the signal receiver 172, so that the position sensor 17 determines that the main arm 11 is in a predetermined initial position. When the breaking portion 113 of the main arm 11 is not located between the signal transmitter 171 and the signal receiver 172, the signal transmission recommences, so the position sensor 17 determines that the main arm 11 has left the predetermined initial position.

Figure 8:
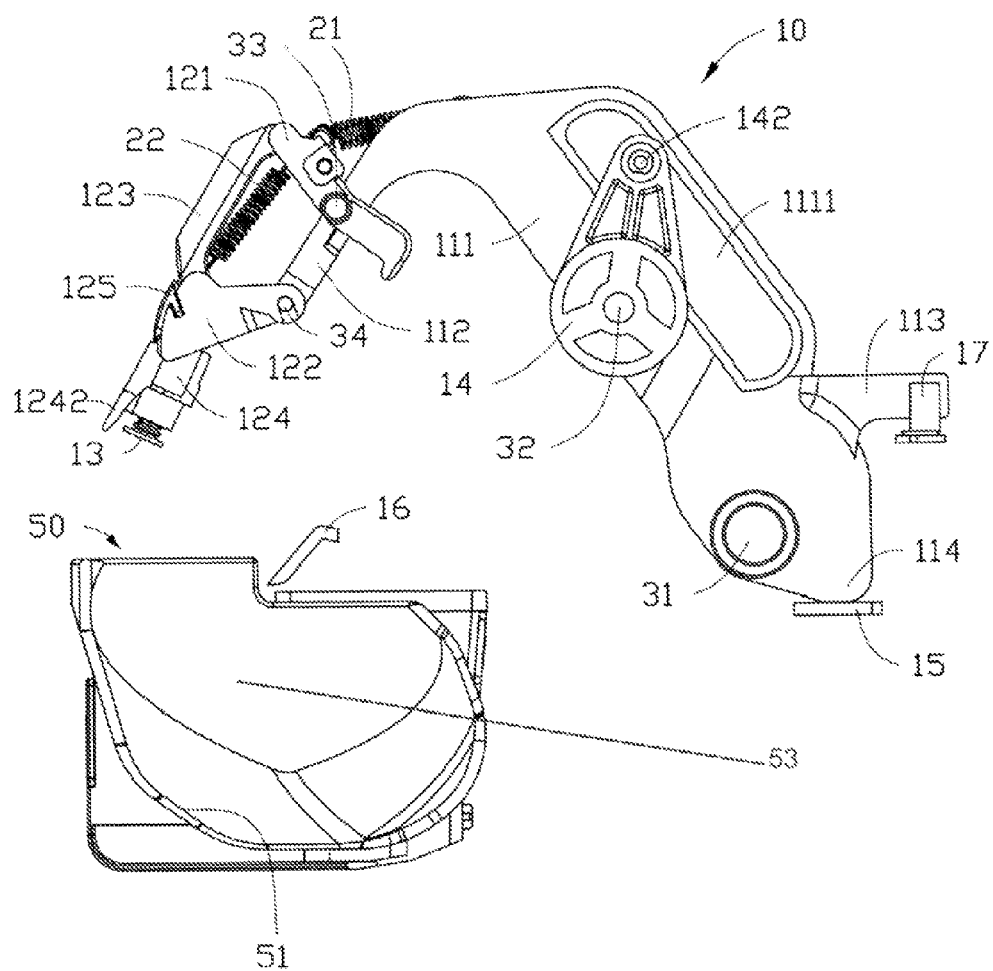
FIG. 8 illustrates the grasping arm being in a predetermined position.

When the main arm 11 is in the predetermined initial position, the contacting portion 114 of the main arm 11 abuts against the second blocking member 15, thereby preventing the main arm 11 from rotating about the first axis 31 in a clockwise direction (in FIG. 8). In one embodiment, the second blocking member 15 is flat and horizontal.

The first blocking member 16 is located on a top wall of the pill storage case 50 and is adjacent to the pill opening 52 of the pill storage case 50. The first blocking member 16 includes a contacting surface 161, which is inclined relative to the top wall 54. In one embodiment, a lower edge of the blocking member 16 is located below the first axis 31, and a top edge of the blocking member 16 is located above the first axis 31.

When the main arm 11 is moved in a counter-clockwise direction (in FIGS. 12-15) to a position where the contacting end 1213 of the first linkage arm 121 abuts against the contacting surface 161 of the first blocking member 16, and the main arm 11 continues moving in the counter-clockwise direction, the blocking member 16 drives the first linkage arm 121 to rotate about the third axis 33 in a counter-clockwise direction, and further drives the third linkage arm 123 to rotate about the fourth axis 34 in a counter-clockwise direction.

In some embodiments, a radius of rotation of the main arm 11 about the first axis 31 is three times greater than a radius of rotation of the driving shaft 142 about the second axis 32. A vertical distance between the first axis 31 and the second axis 32 is three and a half times greater than a horizontal distance between the first axis 31 and the second axis 32.

In one embodiment, the pill grasping mechanism 400 includes a first resilient member 21 and a second resilient member 22. A first end of the first resilient member 21 is connected to the first arm 11, and a second end of the first resilient member 21 is connected to the first linkage arm 121. The first resilient member 21 applies a pulling force to the first linkage arm 121, so that the first linkage arm 121 is biased to rotate about the third axis 33 in a clockwise direction. A first end of the second resilient member 22 is connected to the first linkage arm 121, and a second end of the second resilient member 22 is connected to the holder 124. The second resilient member 22 applies a pulling force to the holder 124, so that the holder 124 is biased to rotate about the fifth axis 35. The first resilient member 21 and the second resilient member 22 can be extension springs.

The second resilient member 22 is located on an interior side of the third linkage arm 123 and the cover 125. When the linkage mechanism 12 enters the storage cavity 53 of the pill storage case 50, the second resilient member 22 is spaced from the pills stored in the pill storage case 50 by the third linkage arm 123 and the cover 125, so that the second resilient member 22 is prevented from contaminating the pills stored in the pill storage case 50.

The interior wall 51 of the pill storage case 50 has a curved surface. When the linkage mechanism 12 enters the storage cavity 53 of the pill storage case 50, the interior wall 51 guides movement of the shovel 1242 of the holder 124.

In one embodiment, the first axis 31, the second axis 32, the third axis 33, the fourth axis 34, and the fifth axis 35 are substantially parallel to each other.

FIGS. 8-19 illustrate a process of the pill grasping mechanism 400 grasping a pill from the pill storage case 50.

In FIG. 8, the main arm 11 is in the predetermined initial position. The contacting portion 114 of the main arm 11 abuts against the second blocking member 15. The blocking member 15 prevents the main arm 11 from rotating about the first axis 31 in the clockwise direction. The breaking portion 113 of the main arm 11 is located between the signal transmitter 171 and the signal receiver 172, and breaks the signal transmission between the signal transmitter 171 and the signal receiver 172. Thus, the position sensor 17 determines that the main arm 11 is in the predetermined initial position.

Figure 9:
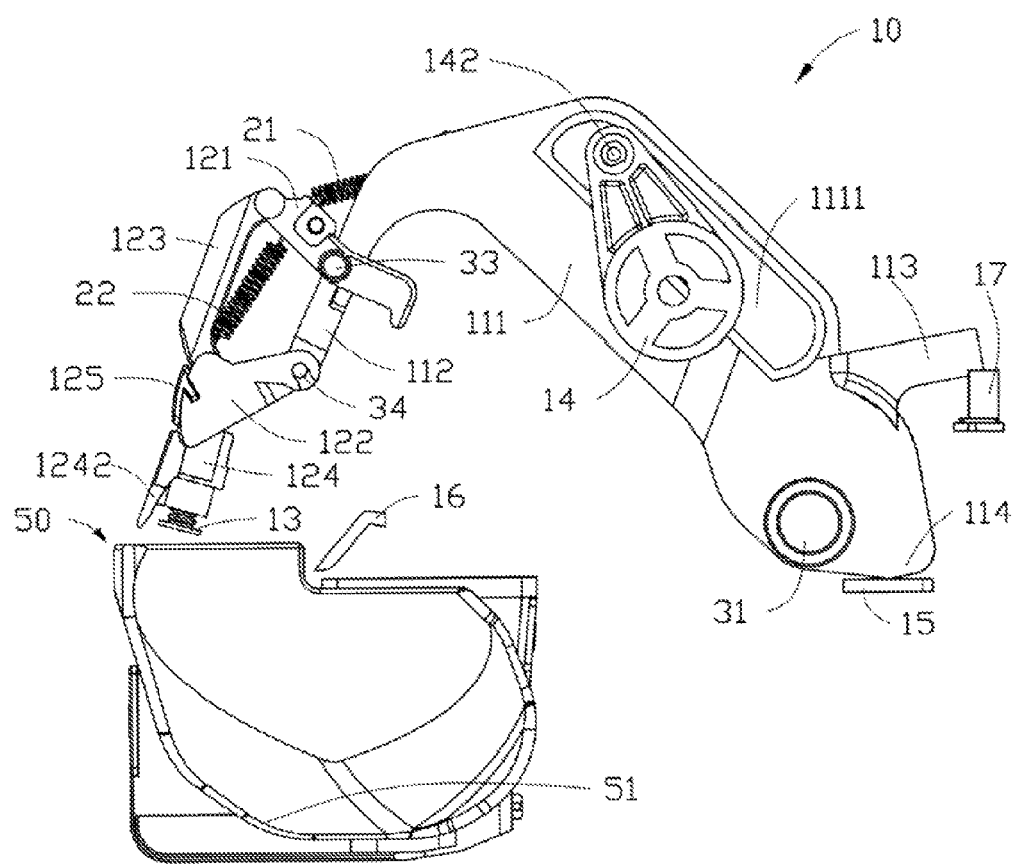
FIG. 9 illustrates the grasping arm starting being rotated in a counter clockwise direction.

In FIG. 9, the transfer cam 141 of the transfer mechanism 14 starts rotating about the second axis 32 in a counter-clockwise direction. The driving wheel 143 of the transfer mechanism 14 rolls along an inner wall of the through hole 1111 of the main arm 11, thus driving the main arm 11 to rotate about the first axis 31 in a counter-clockwise direction. The linkage mechanism 12 and the nozzle 13 are just about to enter the storage cavity 53 of the pill storage case 50, and the breaking portion 113 of the main arm 11 is just about to leave the position sensor 17.

Figure 10:
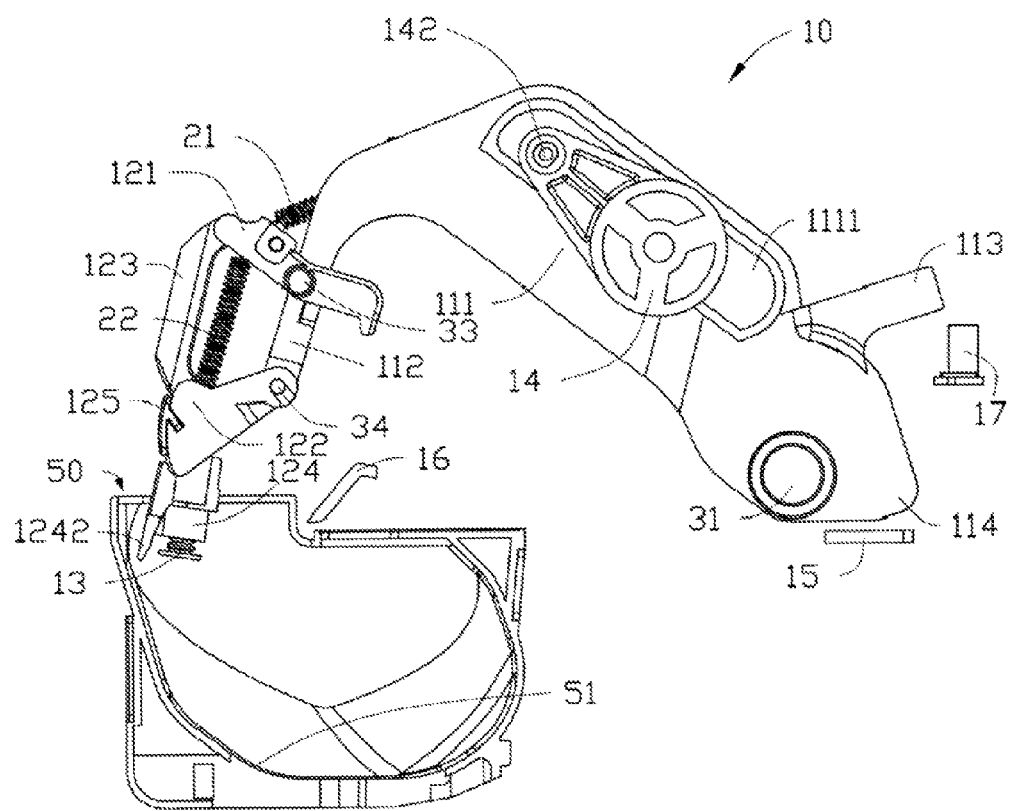
FIG. 10 illustrates the grasping arm continues to be rotated in a counter clockwise direction, and a nozzle being in a high position.

In FIG. 10, the transfer cam 141 of the transfer mechanism 14 continues rotating about the second axis 32 in a counter-clockwise direction. The driving wheel 143 of the transfer mechanism 14 continues rolling along the inner wall of the through hole 1111 of the main arm 11, and driving the main arm 11 to rotate about the first axis 31 in a counter-clockwise direction. The linkage mechanism 12 and the nozzle 13 enter the storage cavity 53 of the pill storage case 50. The breaking portion 113 of the main arm 11 leaves the position sensor 17, thereby enabling the signal transmission between the signal transmitter 171 and the signal receiver 172 to recommence. Thus, the position sensor 17 determines that the main arm 11 has left the predetermined initial position. In this position, the nozzle 13 can pick a pill from a high level of the storage cavity 53 when the storage cavity 53 is fully filled with pills.

Figure 11:
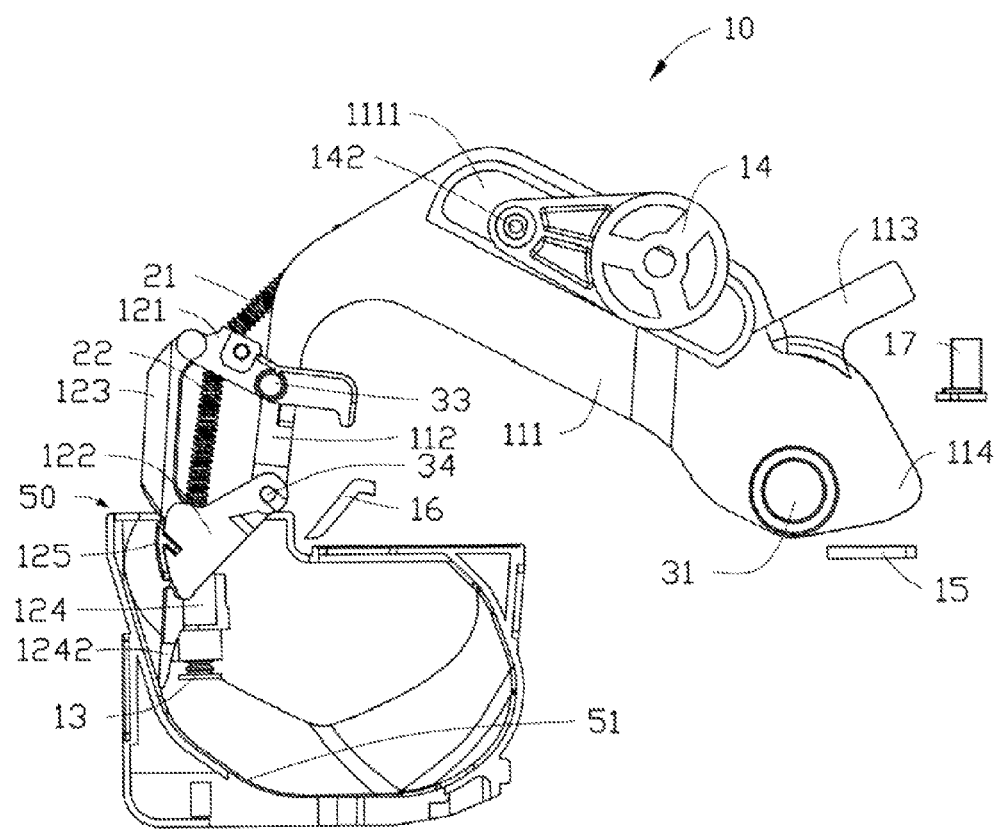
FIG. 11 illustrates the grasping arm continues to be rotated in a counter clockwise direction, and a nozzle being in a middle position.

In FIG. 11, when the nozzle 13 does not pick a pill in the high position, the transfer cam 141 of the transfer mechanism 14 continues rotating about the second axis 32 in a counter-clockwise direction. The driving wheel 143 of the transfer mechanism 14 continues rolling along the inner wall of the through hole 1111 of the main arm 11, and driving the main arm 11 to rotate about the first axis 31 in a counter-clockwise direction. The shovel 1242 of the holder 124 contacts the curved surface of the interior wall 51 and moves along the curved surface under the guidance of the interior wall 51. In this position, the nozzle 13 can pick a pill from a middle level of the storage cavity 53 when the storage cavity 53 is half full.

Figure 12:
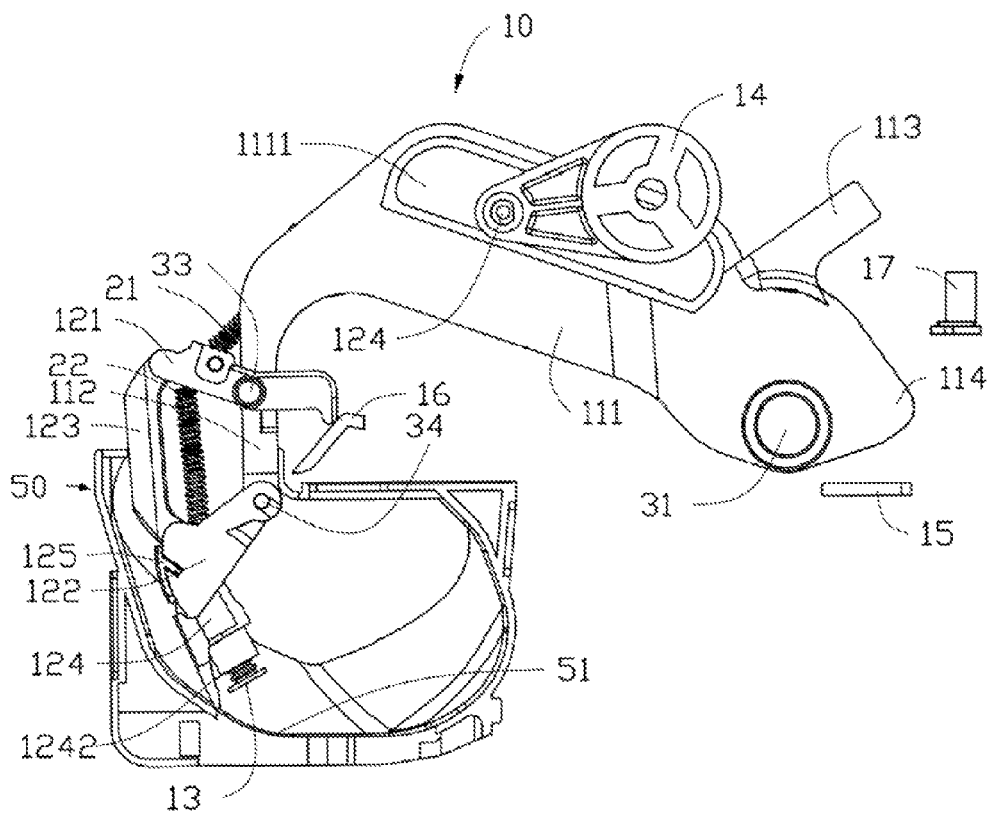
FIG. 12 illustrates the grasping arm continues to be rotated in a counter clockwise direction, and a nozzle being in a low level.

In FIG. 12, when the nozzle 13 does not pick a pill from the middle level, the transfer cam 141 of the transfer mechanism 14 continues rotating about the second axis 32 in a counter-clockwise direction. The driving wheel 143 of the transfer mechanism 14 continues rolling along the inner wall of the through hole 1111 of the main arm 11, and driving the main arm 11 to rotate about the first axis 31 in a counter-clockwise direction. The protrusion 1214 of the contacting end 1213 of the first linkage arm 121 abuts against the contacting surface 161 of the first blocking member 16. The first blocking member 16 drives the first linkage arm 121 to rotate about the third axis 33 in a counter-clockwise direction. The shovel 1242 continues moving along the interior wall 51. In this position, the nozzle 13 can pick a pill from a low level of the storage cavity 53 if the storage cavity 53 is almost empty of pills.

Figure 13:
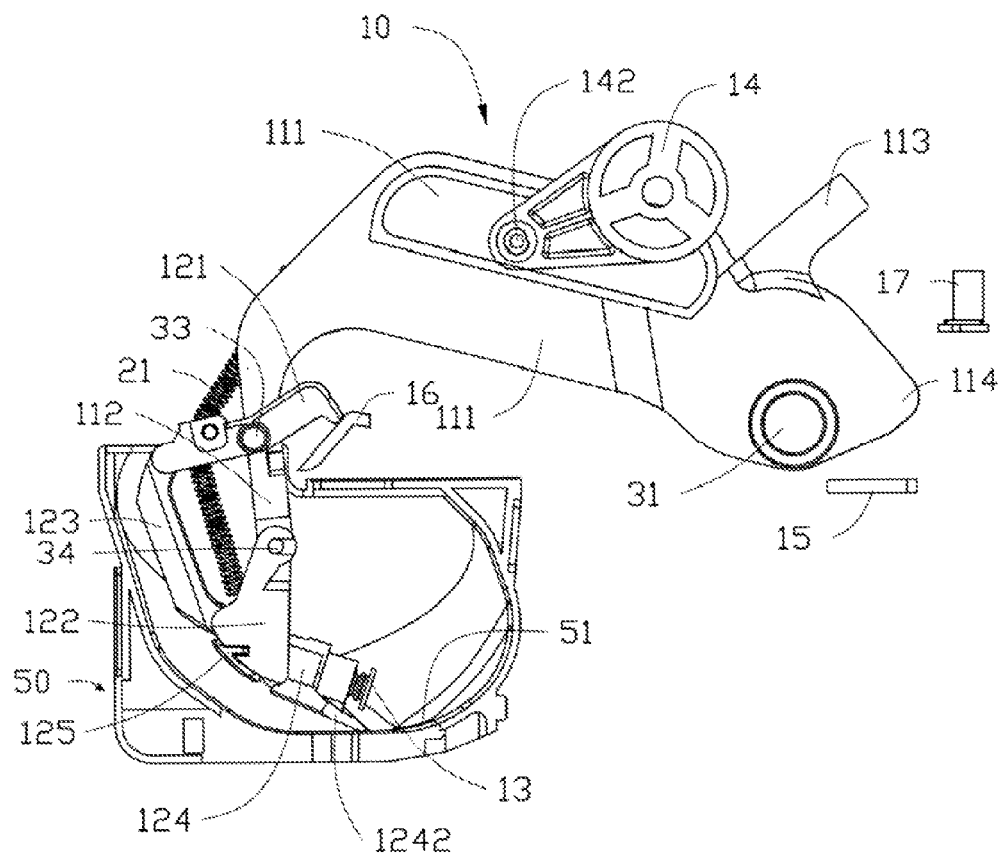
FIG. 13 illustrates the grasping arm continues to be rotated in a counter clockwise direction, and a nozzle being in a lowest level.

In FIG. 13, when the nozzle 13 does not pick a pill from the low level, the transfer cam 141 of the transfer mechanism 14 continues rotating about the second axis 32 in a counter-clockwise direction. The driving wheel 143 of the transfer mechanism 14 continues rolling along the inner wall of the through hole 1111 of the main arm 11, and driving the main arm 11 to rotate about the first axis 31 in a counter-clockwise direction. The first blocking member 161 continues driving the first linkage arm 121 to rotate about the third axis 33 in a counter-clockwise direction, and the shovel 1242 continues moving along the interior wall 51. In this position, the nozzle 13 can pick a pill from a lowest level of the storage cavity 53.

Figure 14:
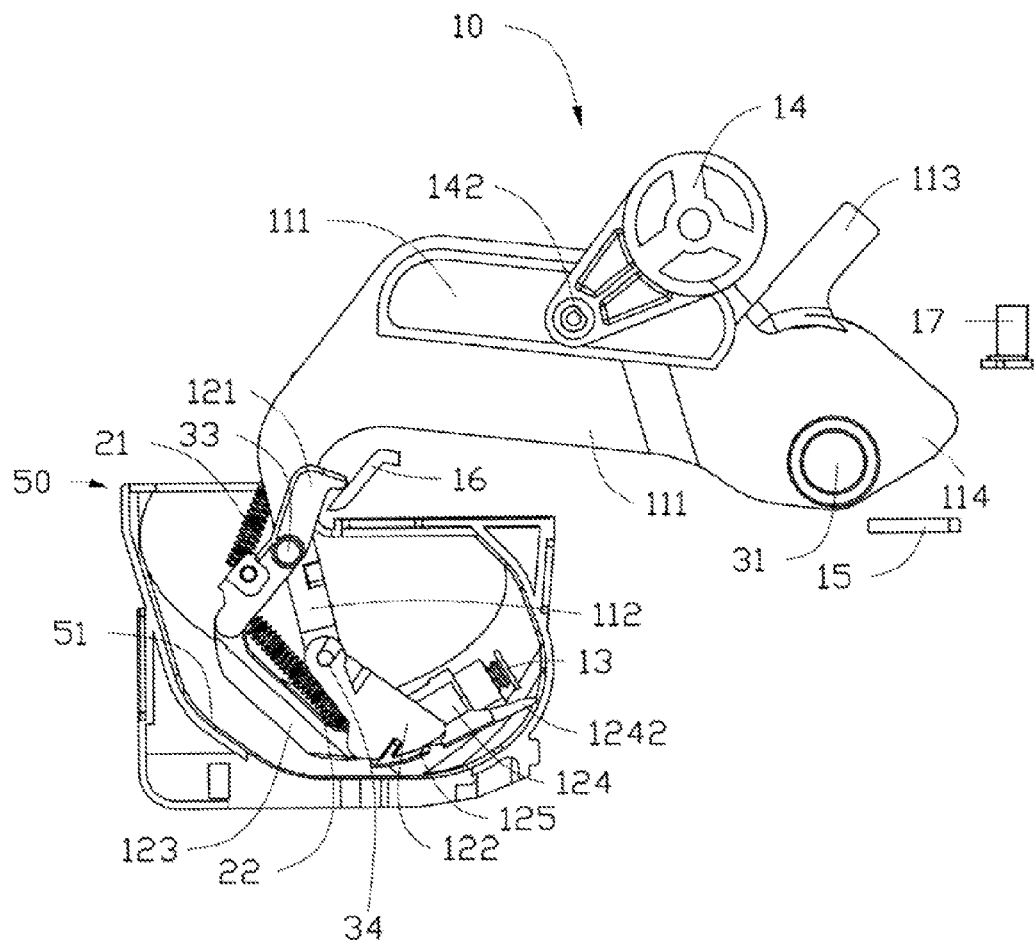
FIG. 14 illustrates the grasping arm continues to be rotated in a clockwise direction, and a nozzle being the lowest level.

In FIG. 14, when the nozzle 13 does not pick a pill from the lowest level, the transfer cam 141 of the transfer mechanism 14 continues rotating about the second axis 32 in a counter-clockwise direction. The driving wheel 143 of the transfer mechanism 14 continues rolling along the inner wall of the through hole 1111 of the main arm 11, and driving the main arm 11 to rotate about the first axis 31 in a counter-clockwise direction. The first blocking member 161 continues driving the first linkage arm 121 to rotate about the third axis 33 in a counter-clockwise direction. The shovel 1242 of the holder 124 moves to the right and up level under the guidance of the interior wall 51, until the nozzle 13 picks a pill in the storage cavity 53 of the pill storage case 50.

When the nozzle 13 has picked a pill from the pill storage case 50, the transfer cam 141 of the transfer mechanism 14 starts rotating about the second axis 32 in a clockwise direction. The driving wheel 143 of the transfer mechanism 14 rolls along the inner wall of the through hole 1111 of the main arm 11, and drives the main arm 11 to rotate about the first axis 31 in a clockwise direction.

Figure 15:
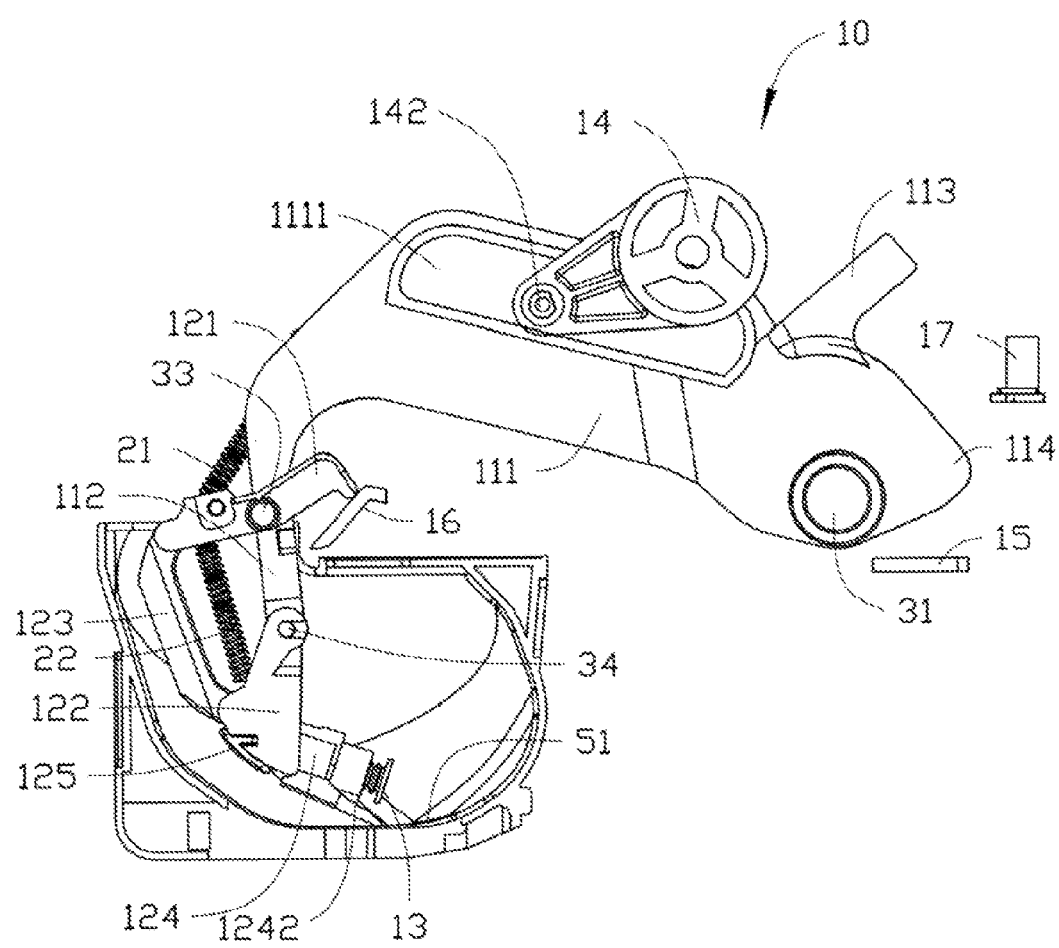
FIG. 15 illustrates the grasping arm continues to be rotated in a clockwise direction, and a nozzle being the low level.

In FIG. 15, the transfer cam 141 of the transfer mechanism 14 continues rotating about the second axis 32 in a clockwise direction. The driving wheel 143 of the transfer mechanism 14 continues driving the main arm 11 to rotate about the first axis 31 in a clockwise direction. The shovel 1242 and the nozzle 13 move to the bottom position of the storage cavity 53 of the pill storage case 50.

Figure 16:
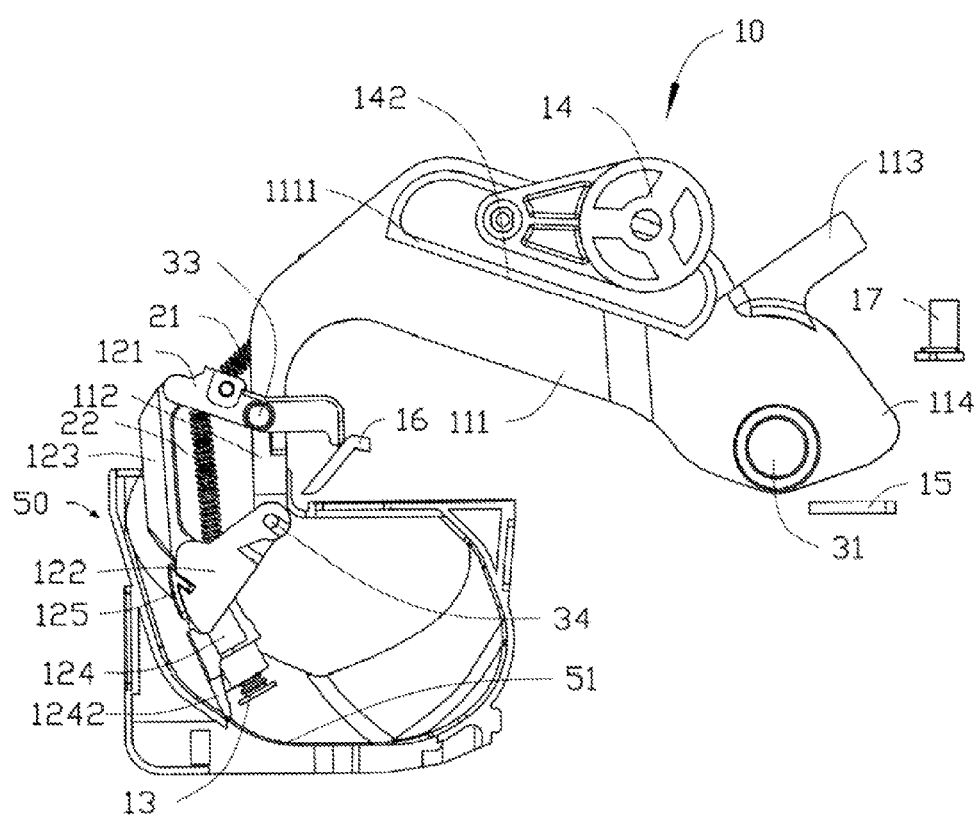
FIG. 16 illustrates the grasping arm continues to be rotated in a clockwise direction, and a nozzle being the bottom level.

FIG. 16 shows the transfer cam 141 of the transfer mechanism 14 continuing to rotate about the second axis 32 in a clockwise direction. The driving wheel 143 of the transfer mechanism 14 continues driving the main arm 11 to rotate about the first axis 31 in a clockwise direction. The shovel 1242 and the nozzle 13 move to the lowest position of the storage cavity 53 of the pill storage case 50.

Figure 17:
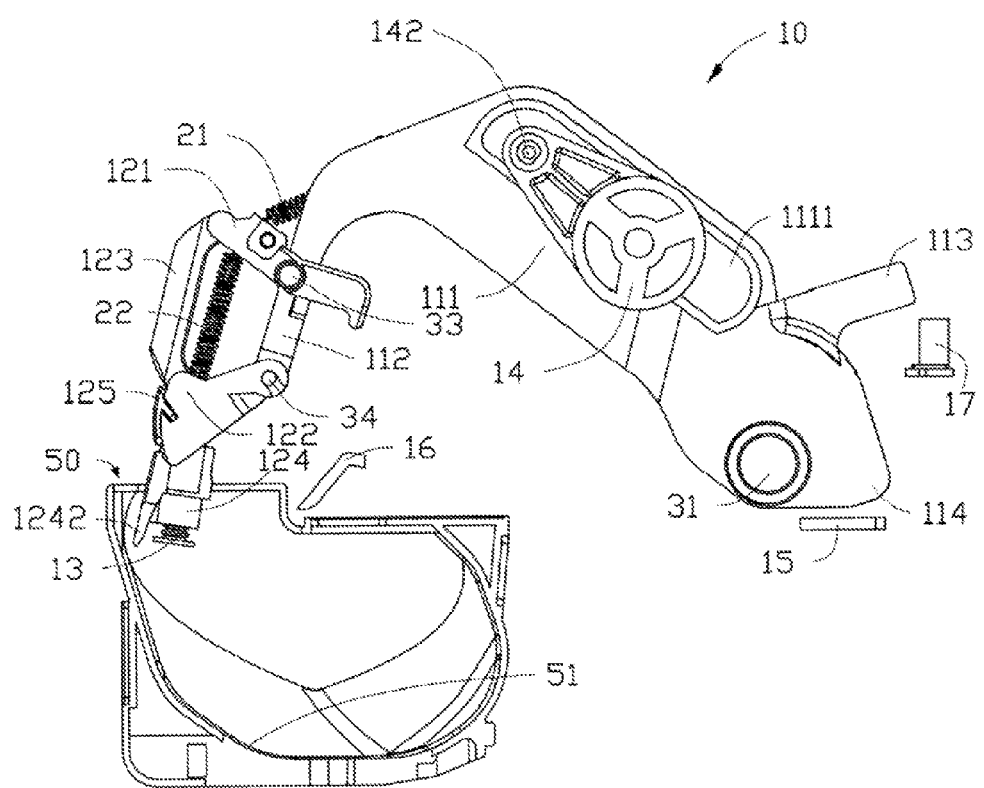
FIG. 17 illustrates the grasping arm continues to be rotated in a clockwise direction, and a nozzle being the high level.

In FIG. 17, the transfer cam 141 of the transfer mechanism 14 continues rotating about the second axis 32 in a clockwise direction. The driving wheel 143 of the transfer mechanism 14 continues driving the main arm 11 to rotate about the first axis 31 in a clockwise direction. The shovel 1242 and the nozzle 13 move up from the lowest position of the storage cavity 53 of the pill storage case 50.

Figure 18:
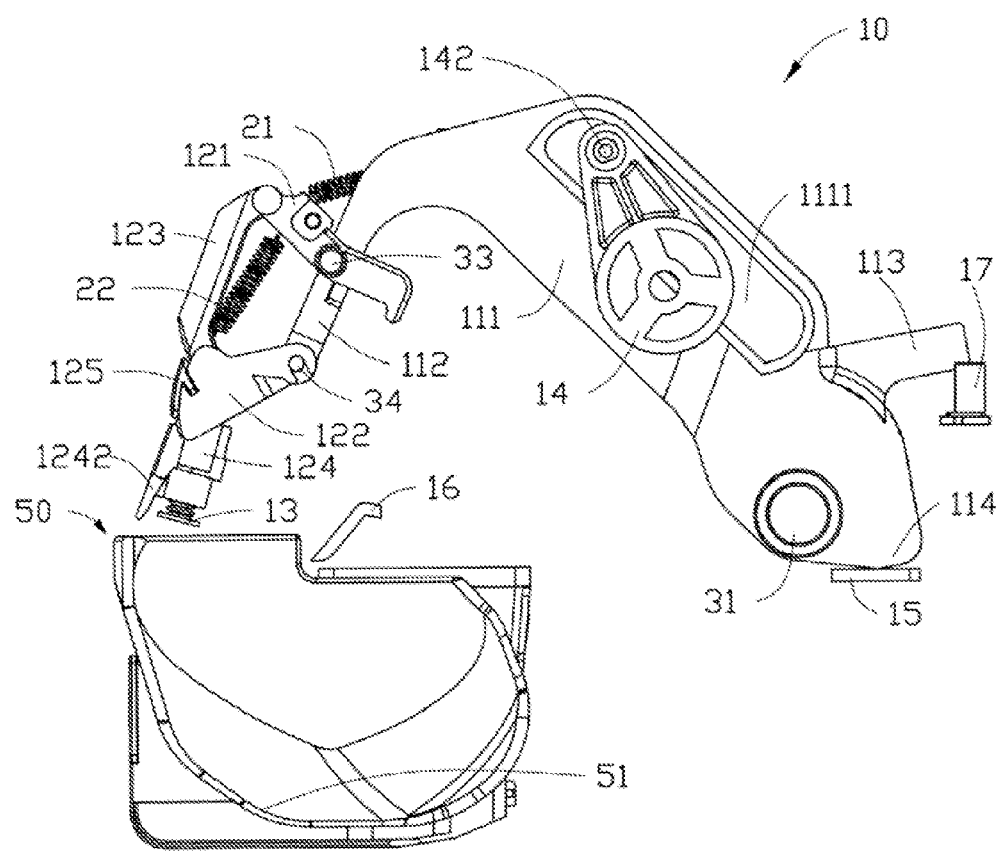
FIG. 18 illustrates the grasping arm continues to be rotated in a clockwise direction, and a nozzle being left the pill storage case.

In FIG. 18, the transfer cam 141 of the transfer mechanism 14 continues rotating about the second axis 32 in a clockwise direction. The driving wheel 143 of the transfer mechanism 14 continues driving the main arm 11 to rotate about the first axis 31 in a clockwise direction. At this point, the shovel 1242 and the nozzle 13 have left the storage cavity 53 of the pill storage case 50. The breaking portion 113 of the main arm 113 is about to move to interrupt the line between the signal transmitter 171 and the signal receiver 172.

Figure 19:
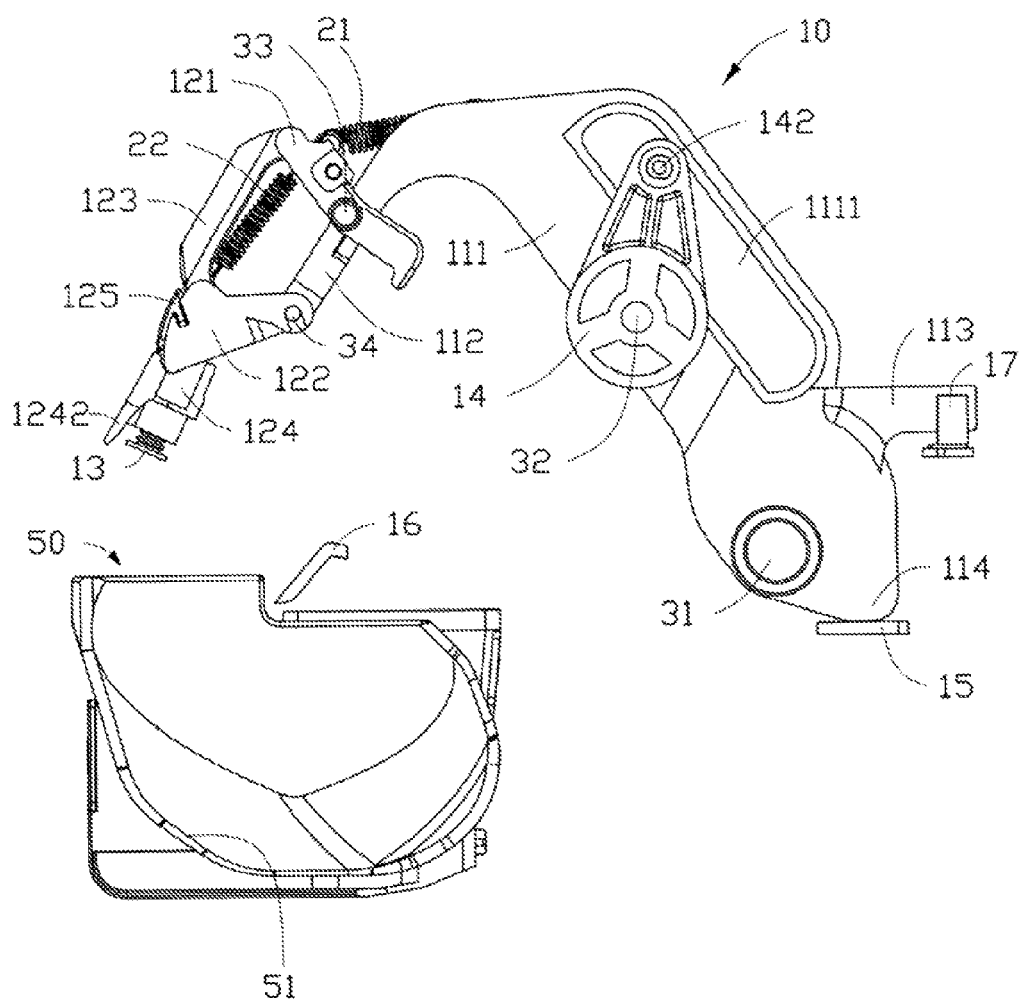
FIG. 19 illustrates the grasping arm continues to be rotated in a clockwise direction, and a nozzle being the high level.
Figure 20:
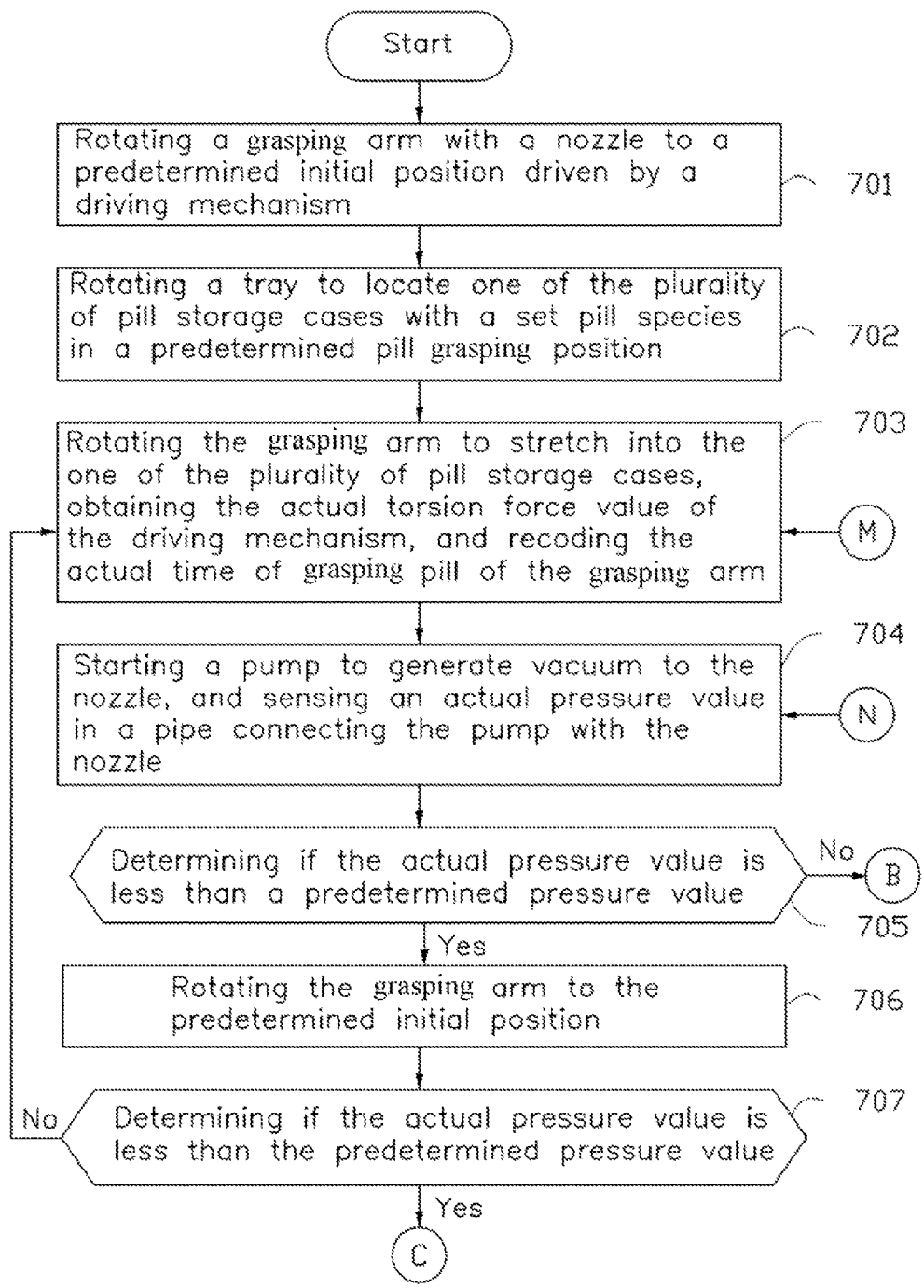
FIGS. 20-22 are a flowchart of one embodiment of a method of grasping a pill.
Figure 21:
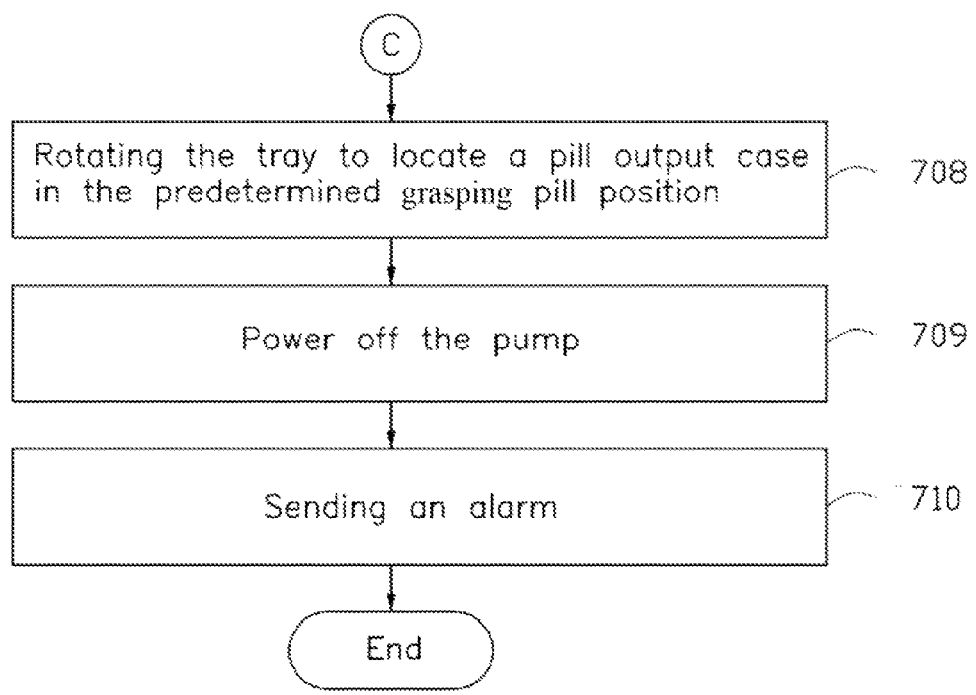
Figure 22:
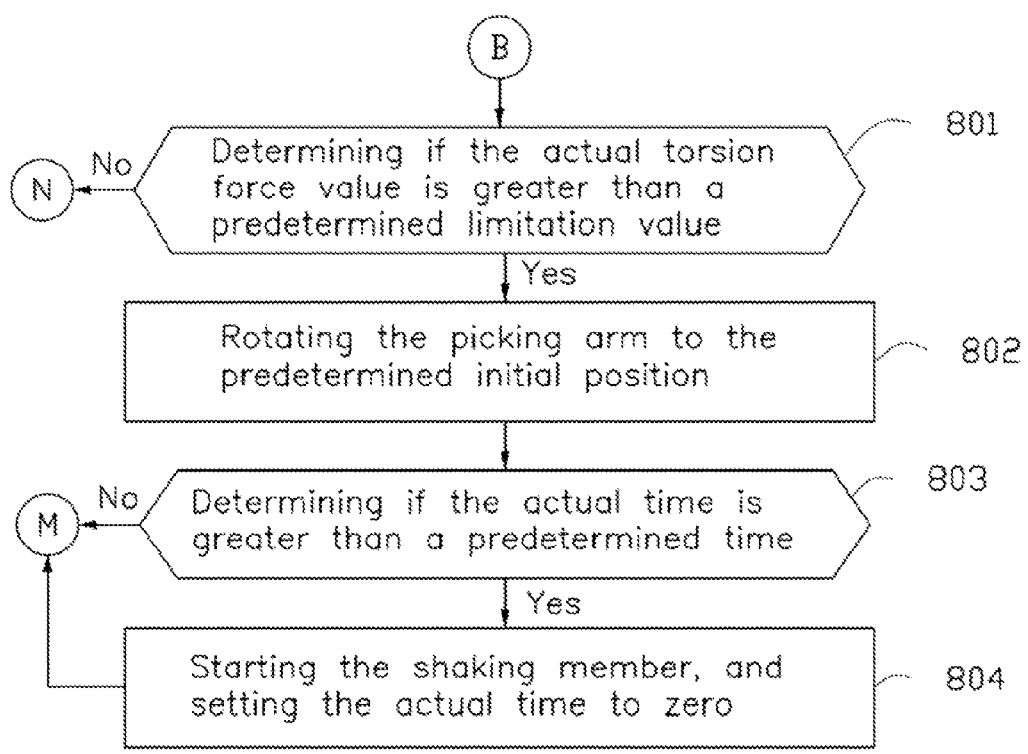

In FIG. 19, the main arm 11 returns to the predetermined initial position. The contacting portion 114 of the main arm 11 abuts against the second blocking member 15. The second blocking member 15 prevents the main arm 11 from rotating about the first axis 31 in a clockwise direction. The breaking portion 113 of the main arm 113 is located between the signal transmitter 171 and the signal receiver 172 and breaks the signal transmission between the signal transmitter 171 and the signal receiver 172. Thus, the position sensor 17 determines that the main arm 11 is in the predetermined initial position. The transfer cam 141 of the transfer mechanism 14 stops rotating, and the driving wheel 143 of the transfer mechanism 14 stops driving the main arm 11 to rotate accordingly.

Referring to FIGS. 4 and 20-22, a pill grasping method comprises the following blocks. The pill grasping method is implemented after the patient sets a time and dose of each kind of pill.

In block 701, the driving mechanism 450 rotates the grasping arm 10 with the nozzle 13 to the predetermined initial position.

In block 702, the actuating mechanism 330 rotates the tray 320 to position the corresponding pill storage case 50 in a predetermined pill grasping position, to allow the grasping arm 10 to pick pills from the pill storage case 50.

In block 703, the driving mechanism 450 rotates the grasping arm 10 to enter into the corresponding pill storage case 50.

The torsion force obtaining unit 220 obtains the actual torsion force value of the second motor 441 of the driving mechanism 450, and the time recording unit 230 records the actual time of grasping pill of the grasping arm 10.

In block 704, the pump 430 is turned on to generate a vacuum in the nozzle 13 to suck a pill, and the pressure sensor 440 senses an actual pressure value of the pipe 470.

In block 705, the pressure determining unit 260 determines if the actual pressure value is less than a predetermined pressure value. The actual pressure value is less than the predetermined pressure value when the nozzle 13 sucks the pill. When the actual pressure value is less than the predetermined pressure value, and the method goes to block 706. Otherwise, the method goes to block 801.

In block 706, the driving mechanism 450 rotates the grasping arm 10 to the predetermined initial position.

In block 707, the pressure determining unit 260 determines if the actual pressure value is less than the predetermined pressure value. When the actual pressure value is less than the predetermined pressure value, the method goes to block 708. When the actual pressure value is greater than or equal to the predetermined pressure value, the method goes to the block 703.

In block 708, the actuating mechanism 330 rotates the tray 320 to position the pill output case 53 in the predetermined grasping pill position.

In block 709, the pump 430 is turned off, and the pill sucked by the nozzle 13 drops into the pill output case 53 and slides out of the enclosure 100.

In block 710, an alarm is sent.

When the pressure value is greater than the predetermined pressure, the method further includes block 801.

In block 801, the torsion force determining unit 240 determines if the actual torsion force value is greater than a predetermined limitation value. If the actual torsion force value is greater than the predetermined limitation value, the method goes to block 802. Otherwise, the method goes to the block 704.

In block 802, the driving mechanism 450 rotates the grasping arm 10 to the predetermined initial position.

In block 803, the time determining unit 250 determines if the actual time is greater than a predetermined time. If the actual time is greater than the predetermined time, the method goes to block 804. Otherwise, the method goes to the block 703.

In block 804, the controlling chip 200 starts the shaking member 340. The shaking member 340 shakes the pill storage case 50 for a predetermined time duration and sets the actual time to zero, then the method goes to the block 703.

It is to be understood that even though numerous characteristics and advantages have been set forth in the foregoing description of embodiments, together with details of the structures and functions of the embodiments, the disclosure is illustrative only and changes may be made in detail, including in the matters of shape, size, and arrangement of parts within the principles of the disclosure. The disclosed embodiments are illustrative examples, and are not intended to limit the scope of the following claims.

What is claimed is:
1. A pill grasping method, the method comprising:
rotating a grasping arm with a nozzle to a predetermined initial position driven by a driving mechanism;
rotating a plurality of pill storage cases to locate one of the plurality of pill storages with a set pill species to a predetermined grasping pill position driven by an actuating mechanism;

rotating the grasping arm to stretch into the one of the plurality of pill storage case;
starting a pump to generate a vacuum to the nozzle for sucking a pill;
determining if an actual pressure value in a pipe connecting the nozzle to the pump being less than a predetermined pressure value; and
rotating the grasping arm to the predetermined initial position when the actual pressure is less than the predetermined pressure value;
wherein after the block of rotating a plurality of pill storage cases to locate one of the plurality of pill storages with a set pill species to a predetermined grasping pill position and before the block of starting a pump to generate a vacuum to the nozzle for sucking a pill, the method further comprises:
obtaining an actual torsion force value of the driving mechanism;
determining if the actual pressure value is less than the predetermined pressure value;
determining if the actual torsion force value is greater than a predetermined limitation value when the actual pressure value is not less than the predetermined pressure value; and
rotating the grasping arm to the predetermined initial position when the actual torsion force value is greater than the predetermined limitation value.

2. The pill grasping method of claim 1, wherein after the block of rotating the grasping arm to the predetermined initial position when the actual pressure is less than the predetermined pressure value, the method further comprises:
determining if the actual pressure value is less than the predetermined pressure value;
rotating a pill output case to the predetermined grasping pill position when the actual pressure value is not less than the predetermined pressure value;
powering off the pump to drop out of the pill to the pill output case; and
sending a notice signal.

3. The pill grasping method of claim 2 further comprising:
rotating the grasping arm to stretch into the one of the plurality of pill storage case when the actual pressure value is greater than the predetermined pressure value.

4. The pill grasping method of claim 1, wherein after the block of rotating the grasping arm to stretch into the one of the plurality of pill storage case before the block of determining if an actual pressure value in a pipe connecting the nozzle with the pump being less than a predetermined pressure value, the method further comprises:
sensing the actual pressure value of the pipe.

5. The pill grasping method of claim 1, wherein after the block of rotating a plurality of pill storage cases to locate one of the plurality of pill storages with a set pill species to a predetermined grasping pill position and before the block of starting a pump to generate an vacuum to the nozzle for suck a pill, the method further comprises:
recording an actual time of the grasping arm;
determining if the actual time is greater than a predetermined time;
starting a shaking member to shake the one of the plurality of pill storage case when the actual time is greater than the predetermined time; and
setting the actual time to zero.

6. The pill grasping method of claim 5 further comprising:
rotating the grasping arm to stretch into the one of the plurality of pill storage case when the actual time is not greater than the predetermined time.

7. The pill grasping method of claim 1 further comprising:
rotating the grasping arm to stretch into the one of the plurality of pill storage case when the torsion force value is greater than the predetermined limitation value.

8. An automatic pill grasping apparatus, comprising:
a base;
a pill grasping mechanism comprising a grasping arm, a nozzle, and a driving mechanism, the grasping arm being rotatably installed on the base, the driving mechanism attached to the base; and
a pill storage mechanism comprising a plurality of pill storage cases for storing pills, and an actuating mechanism; the plurality of pill storage cases being rotatably secured to the base, and the actuating mechanism being attached to the base,
wherein the plurality of pill storage cases is rotatable relative to the base driven by the actuating mechanism, the grasping arm is rotatable relative to the base to stretch the nozzle into one of the plurality of pill storage cases to suck pills; and
wherein the grasping arm comprises a main arm and a linkage mechanism pivotably mounted to the main arm, the main arm being rotatable about a first axis, the linkage mechanism further comprises a holder which is pivotable relative to the main arm, and the nozzle is mounted to the holder.

9. The automatic pill grasping apparatus of claim 8, wherein the pill grasping mechanism further comprises a pump, and a pipe, the pipe is connected to the pump and the nozzle, and the pump is configured to generate vacuum to the nozzle through the pipe.

10. The automatic pill grasping apparatus of claim 9, wherein the pill grasping mechanism further comprises a filter, and the filter is configured to filter the vacuum.

11. The automatic pill grasping apparatus of claim 8, wherein the grasping arm further comprises a transfer mechanism; the main arm defines an opening, the transfer mechanism comprises a transfer cam being rotatable about a second axis and a driving wheel mounted to the transfer cam and received in the opening of the main arm, when the transfer cam rotates about the second axis, the driving wheel is rotated about the second axis by the transfer cam and is adapted to press an edge of the opening of the main arm and to drive the main arm to rotate about the first axis.

12. The automatic pill grasping apparatus of claim 11, wherein the transfer mechanism further comprises a driving shaft secured to the transfer cam, the driving wheel is mounted to a free end of the driving shaft, the free end of the driving shaft extends into the opening of the main arm, when the transfer cam rotates about the second axis, the driving shaft is rotated about the second axis by the transfer cam.

13. The automatic pill grasping apparatus of claim 12, wherein the first axis is substantially parallel to the second axis.

14. The automatic pill grasping apparatus of claim 13, wherein a vertical distance between the first axis and the second axis is three and one half times greater than a horizontal distance between the first axis and the second axis.

15. The automatic pill grasping apparatus of claim 13, wherein the transfer cam defines one or more slots for connecting to a motor, the transfer cam is rotated by the motor.

16. The automatic pill grasping apparatus of claim 13, wherein a radius of rotation of the main arm about the first axis is three times greater than a radius of rotation of the driving shaft about the second axis.

17. The automatic pill grasping apparatus of claim 13, wherein the linkage mechanism further comprises a first linkage arm, a second linkage arm, and a third linkage arm, the first linkage arm and the second linkage arm are pivotably mounted to the main arm, a first end of the third linkage arm is pivotably mounted to the first linkage arm, a second end of the third linkage arm is pivotably mounted to the second linkage arm, and the holder is pivotably mounted to the second linkage arm.

18. The automatic pill grasping apparatus of claim 17, wherein the holder comprises a receiving portion for receiving the nozzle and a shovel located on an outer side of the receiving portion.

19. The automatic pill grasping apparatus of claim 17, further comprising a first blocking member, wherein when the main arm rotates to a position where the first linkage arm abuts against the first blocking member, the first blocking member is adapted to drive the first linkage arm to rotate relative to the main arm.

* * * * *